US006480152B2

(12) United States Patent
Lin et al.

(10) Patent No.: US 6,480,152 B2
(45) Date of Patent: Nov. 12, 2002

(54) INTEGRATED GPS/IMU METHOD AND MICROSYSTEM THEREOF

(75) Inventors: Ching-Fang Lin, Simi Valley, CA (US); Dong An, Simi Valley, CA (US)

(73) Assignee: American GNC Corporation, Simi Valley, CA (US)

( * ) Notice: Subject to any disclaimer, the term of this patent is extended or adjusted under 35 U.S.C. 154(b) by 0 days.

(21) Appl. No.: 09/912,158

(22) Filed: Jul. 20, 2001

(65) Prior Publication Data

US 2002/0021245 A1 Feb. 21, 2002

Related U.S. Application Data

(60) Provisional application No. 60/219,957, filed on Jul. 20, 2000.

(51) Int. Cl.[7] ............................................... H04B 7/185
(52) U.S. Cl. .............................. 342/357.14; 342/357.06
(58) Field of Search ...................... 342/357.01, 357.06, 342/357.14; 701/213, 214, 220

(56) References Cited

U.S. PATENT DOCUMENTS 5,075,693 A * 12/1991 McMillan et al. .......... 342/457
6,131,058 A * 10/2000 Boeinghoff et al. ........... 701/34
6,163,021 A * 12/2000 Mickelson ................. 244/3.2

\* cited by examiner

*Primary Examiner*—Dao Phan
(74) *Attorney, Agent, or Firm*—Raymond Y. Chan; David & Raymond Patent Group

(57) ABSTRACT

An integrated Global Positioning System (GPS)/Inertial Measurement Unit (IMU) method and MicroSystem is disclosed, wherein data from an IMU, a MEMS IMU preferred, a GPS chipset, and an earth magnetic field detector are mixed in a mixed GPS/IMU/Magnetic Data microprocessor to achieve a low cost, micro size, and low power consumption mixed GPS/IMU/magnetic position, velocity, and attitude solution. Furthermore, to deal with sensitivity of the MEMS inertial sensors to environment temperature, a temperature based scheduler, error estimator, and a current acting error estimator are co-operated to minimize the mismatching between the filter system modules and the actual ones due to change of environment temperature, so that the system of the present invention can provide high performance and stable navigation solution over a wide range of environment temperature.

14 Claims, 9 Drawing Sheets

INTEGRATED GPS/IMU METHOD AND MICROSYSTEM THEREOF

CROSS REFERENCE OF RELATED APPLICATIONS

This is a regular application of a provisional application having an application Ser. No. of 60/219,957 and a filing date of Jul. 20, 2000.

BACKGROUND OF THE PRESENT INVENTION

1. Field of the Present Invention

The present invention relates to a motion measurement system, and more particularly to an integrated Global Positioning System (GPS)/Inertial Measurement Unit (IMU) micro system, which can produce highly accurate, digital angular rate, acceleration, position, velocity, and attitude measurements of a carrier under a variety of environment.

2. Description of Related Arts

In the past decade, an IMU or GPS receiver is commonly employed to determine the motion measurement of a carrier.

An IMU is a key part of an inertial navigation system (INS). Generally, an INS consists of an IMU, a microprocessor and associated embedded navigation software. The components of the IMU include the inertial sensors (angular rate producer and acceleration producer, traditionally called gyros and accelerometers or angular rate sensor and acceleration sensor) and the associated hardware and electronics. Based on the carrier acceleration and rotation rate measurements obtained from the onboard inertial sensors, the position, velocity, and attitude measurements of a carrier are obtained by numerically solving Newton's equations of motion through the microprocessor.

In principle, an IMU relies on three orthogonally mounted inertial angular rate producers and three orthogonally mounted acceleration producers to produce three-axis angular rate and acceleration measurement signals. The three orthogonally mounted inertial angular rate producers and three orthogonally mounted acceleration producers with additional supporting mechanical structure and electronic devices are conventionally called an Inertial Measurement Unit (IMU). The conventional IMUs may be catalogued into Platform IMU and Strapdown IMU.

In the platform IMU, angular rate producers and acceleration producers are installed on a stabilized platform. Attitude measurements can be directly picked off from the platform structure. But attitude rate measurements can not be directly obtained from the platform. Moreover, highly accurate feedback control loops are required to implement the platform IMU.

Compared with the platform IMU, in a strapdown IMU, angular rate producers and acceleration producers are directly strapped down with the carrier and move with the carrier. The output signals of the strapdown angular rate producers and acceleration producers are angular rate and acceleration measurements expressed in the carrier body frame. The attitude measurements can be obtained by means of a series of computations.

A conventional IMU uses a variety of inertial angular rate producers and acceleration producers. Conventional inertial angular rate producers include iron spinning wheel gyros and optical gyros, such as Floated Integrating Gyros (FIG), Dynamically Tuned Gyros (DTG), Ring Laser Gyros (RLG), Fiber-Optic Gyros (FOG), Electrostatic Gyros (ESG), Josephson Junction Gyros (JJG), Hemisperical Resonating Gyros (HRG), etc. Conventional acceleration producers include Pulsed Integrating Pendulous Accelerometer (PIPA), Pendulous Integrating Gyro Accelerometer (PIGA), etc.

The inertial navigation system, which uses a platform IMU, in general, is catalogued as a gimbaled inertial navigation system. The inertial navigation system which uses a strapdown IMU is, in general, catalogued as a strapdown inertial navigation system. In a gimbaled inertial navigation system, the angular rate producer and acceleration producer are mounted on a gimbaled platform to isolate the sensors from the rotations of the carrier so that the measurements and navigation calculations can be performed in a stabilized navigation coordinated frame. Generally, the motion of the carrier can be expressed in several navigation frames of reference, such as earth centered inertial (ECI), earth-centered earth-fixed (ECEF), locally level with axes in the directions of north-east-down (NED) or east-north-up (ENU) or north-west-up (NWU), and locally level with a wander azimuth. In a strapdown inertial navigation system, the inertial sensors are rigidly mounted to the carrier body frame. In order to perform the navigation computation in the stabilized navigation frame, a coordinate frame transformation matrix is established and updated in a high rate to transform the acceleration measurements from the body frame to the navigation frame.

In general, the motion measurements from the gimbaled inertial navigation system are more accurate than the ones from the strapdown inertial navigation system. Moreover, the gimbaled inertial navigation system is easier to be calibrated than the strapdown inertial navigation system. But, a gimbaled inertial navigation system is more complex and expensive than a strapdown inertial navigation system. The strapdown inertial navigation systems become the predominant mechanization due to their low cost, reliability, and small size.

An inertial navigation system is based on the output of inertial angular rate producer and acceleration producer of an IMU to provide the position, velocity, and attitude information of a carrier through a deadreckoning method. Inertial navigation systems, in principle, permit self-contained operation and output continuous position, velocity, and attitude data of a carrier after loading the starting position and performing an initial alignment procedure.

In addition to the self-contained operation, other advantages of an inertial navigation system include the full navigation solution and wide bandwidth.

However, an inertial navigation system is expensive and is degraded with drift in output (position, velocity, and attitude) over an extended period of time. It means that the position errors, velocity errors, and attitude errors increase with time. This error propagation characteristic is primarily caused by many error sources, such as, gyro drift, accelerometer bias, misalignment, gravity disturbance, initial position and velocity errors, and scale factor errors.

Generally, the ways of improving accuracy of inertial navigation systems include employing highly accurate inertial sensors and aiding the inertial navigation system using an external sensor.

However, current highly accurate inertial sensors are very expensive with big size and heavy weight.

A GPS receiver has been commonly used to aid an inertial navigation system recently. The GPS is a satellite-based, worldwide all-weather radio positioning and timing system. The GPS system is originally designed to provide precise position, velocity, and timing information on a global common grid system to an unlimited number of adequately equipped users.

A specific GPS receiver is the key for a user to access the global positioning system. A conventional, single antenna GPS receiver supplies world-wide, highly accurate three dimensional position, velocity, and timing information, but not attitude information, by processing so-called pseudo range and range rate measurements from the code tracking loops and the carrier tracking loops in the GPS receiver, respectively. In a benign radio environment, the GPS signal propagation errors and GPS satellite errors, including selective availability, serve as the bounds for positioning errors. However, the GPS signals may be intentionally or unintentionally jammed or spoofed, and the GPS receiver antenna may be obscured during carrier attitude maneuvering, and the performance degrades when the signal-to-noise ratio of the GPS signal is low and the carrier is undergoing highly dynamic maneuvers.

As both the cost and size of high performance GPS receivers are reduced in the past decade, a multiple-antenna GPS receiver can provide both position and attitude solution of a carrier, using interferometric techniques. This technology utilizes measurements of GPS carrier phase differences on the multiple-antenna to obtain highly accurate relative position measurements. Then, the relative position measurements are converted to the attitude solution. The advantages of this approach are long-term stability of the attitude solution and relatively low cost. However, this attitude measurement system retains the characterization of low bandwidth and is susceptible to shading and jamming, and requires at least 3 antennas configurations for a three-axis attitude solution, and requires antenna separation enough for high attitude resolution.

Because of the inherent drawbacks of a stand-alone inertial navigation system and a stand-alone GPS receiver, a stand-alone inertial navigation system or a stand-alone GPS receiver can not meet mission requirements under some constraints, such as low cost, long-term high accuracy, high rate output, interrupt-free, etc.

Performance characteristics of the mutually compensating stand-alone GPS receiver and the stand-alone inertial navigation system suggest that, in many applications, an integrated GPS/IMU system, combining the best properties of both systems, will provide superior accurate continuous navigation capability. This navigation capability is unattainable in either one of the two systems alone.

The benefits offered by an integrated GPS/IMU system are outlined as follows:

(1) The aiding of the GPS receiver's signal-tracking loop process with inertial data from the INS allows the effective bandwidth of the loops to be reduced, resulting in an improved tracking signal in a noisy and dynamic environment.

(2) An inertial navigation system not only provides navigation information when the GPS signal is lost temporarily, but also reduces the search time required to reacquire GPS signals.

(3) Inertial navigation system errors and inertial sensor errors can be calibrated while the GPS signal is available, so that the inertial navigation system can provide more accurate position information after the GPS signal is lost.

(4) The GPS enables and provides on-the-fly alignment of an inertial navigation system by means of maneuvering, eliminating the static initial self-alignment of the pre-mission requirements of the stand-alone inertial navigation system.

Conventional IMUs commonly have the following features:

High cost,

Large bulk (volume, mass, large weight),

High power consumption,

Limited lifetime, and Long turn-on time.

Conventional GPS devices systems can be catalogued into two families:

Full-functional GPS receivers, including display, I/O ports.

GPS OEM engine modules.

A conventional integrated GPS/IMU system also has the following features:

High cost,

Large bulk (volume, mass, large weight),

High power consumption,

Limited lifetime, and Long turn-on time.

These present deficiencies of conventional integrated GPS/IMU systems prohibit them from use in the emerging cost-sensitive commercial applications, such as control of phased array antennas for mobile communications, automotive navigation, and handheld equipment.

MEMS, or, as stated more simply, micromachines, are believed as the next logical step in the silicon revolution. It is forecasted that this coming step will be different, and more important than simply packing more transistors onto silicon. The hallmark of the next thirty years of the silicon revolution will be the incorporation of new types of functionality onto the chip structures, which will enable the chip to, not only think, but to sense, act, and communicate as well. MEMS inertial sensors offer tremendous cost, size, and reliability improvements for guidance, navigation, and control systems, compared with conventional inertial sensors.

Meanwhile, new horizons are opening up for GPS technology. A tiny, inexpensive GPS chip sets such as the Mitel GP2000 and the SiRFstar GRF1/LX Chip, which are small enough to fit into a cellular phone or hand-held computer but powerful enough to receive GPS satellite signals, are advanced now. Upcoming consumer electronics devices such as cellular phones are planed to use it.

Although the availability of MEMS angular rate sensors and MEMS accelerometers and GPS chipsets makes it possible to achieve an integrated GPS/IMU microsystem, it's still challenging to design and fabricate a high accurate and reliable integrated GPS/IMU microsystem with features of low cost, small size, weight light, and low power consumption. Also, a high performance, small size, and low power consumption integrated GPS/IMU microsystem can create more commercial applications than a conventional GPS/IMU system.

SUMMARY OF THE PRESENT INVENTION

A main objective of the present invention is to provide an integrated GPS/IMU method and micro system, which can produce highly accurate, position, velocity, attitude, and heading measurements of the carrier under dynamic environments.

Another objective of the present invention is to provide an integrated GPS/IMU method and microsystem, wherein successfully incorporates the MEMS inertial sensors and GPS chipset technologies.

Another objective of the present invention is that three axes of the Earth's magnetic field vector measurement from a tiny Earth's magnetic field detector, such as a magnetometer, is incorporated to stabilize the heading solution of the system of the present invention.

Another objective of the present invention is that the Kalman filter is implemented in real time to optimally blend the GPS raw data and the INS solution to obtain the blended navigation solution.

Another objective of the present invention is that a robust Kalman filter is implemented in real time to eliminate the possible instability of the integration solution.

Another objective of the present invention is that a temperature based scheduler, error estimator, and a current acting error estimator are co-operated to minimize the mismatching between the filter system modules and actual ones due to change of environment temperature, so that the system of the present invention can provide high performance and stable navigation solution over a wide range of environment temperature.

Another objective of the present invention is to use the inertial velocity and acceleration from a position and attitude processor, which are corrected by a Kalman filter, to aid the code and carrier phase tracking of the GPS satellite signals in a GPS receiver so as to enhance the performance of the integrated GPS/IMU in heavy jamming and high dynamic environments.

Another objective of the present invention is to improve the accuracy of the GPS receiver position and velocity solution by using a differential GPS method. To accurately determine the GPS receiver's position and velocity at the centimeter level, the GPS carrier phase measurements are used and the differential GPS is employed.

Another objective of the present invention is that the self-contained INS extends the GPS solution as the GPS receiver loses lock on the GPS signals. Once the GPS receiver regains the signals and then estimates the receiver's position and velocity, the output (position and velocity) of the GPS receiver is used to correct the drifted position and velocity of the INS.

Another objective of the present invention is that a data link is used to transfer the differential GPS correction data, such as position, velocity, and raw measurement corrections (pseudorange, range rate, and carrier phase corrections), from a GPS reference site (wherein a GPS receiver is established with a known position) to the micro integrated GPS/IMU system. Using the differential GPS and carrier phase measurements. the accuracy of the GPS positioning is of the order of centimeter level after fixing the integer ambiguities, and, as a result, the micro integrated GPS/IMU system is applicable to highly accurate position requirements.

DETAILED DESCRIPTION OF THE PREFERRED EMBODIMENT

The present invention provides an integrated GPS/IMU method and microsysterm (Micro System) to blend raw motion measurements from an inertial measurement unit (IMU), a GPS chipset, and the Earth's magnetic field detector to improve the accuracy of the position, velocity, and attitude solution deduced from raw motion measurements for the inertial measurement unit only, in order to output highly accurate mixed GPS/IMU/magnetic navigation solution.

Figure 1:
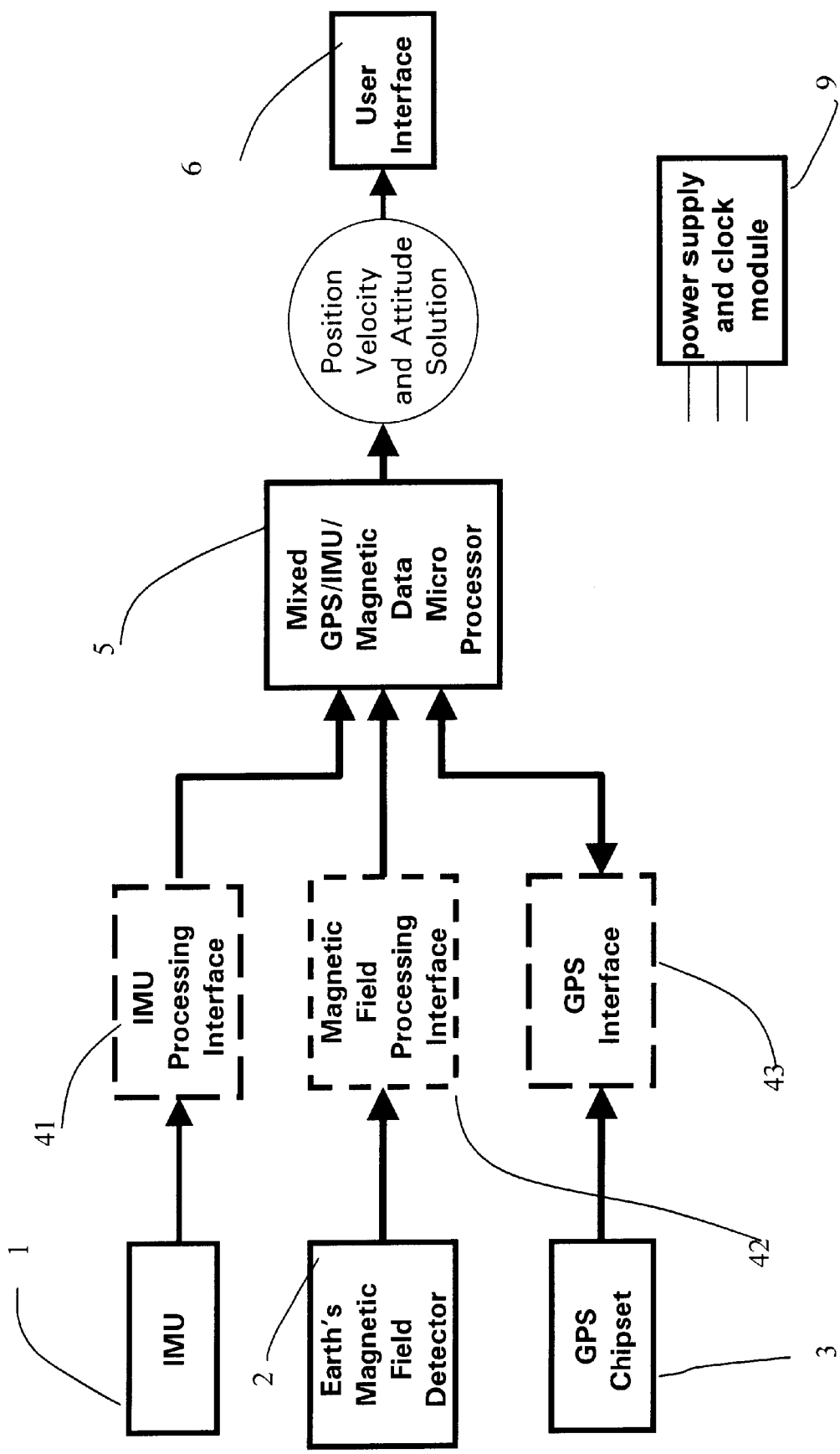
FIG. 1 is a block diagram illustrating the integrated GPS/IMU microsystem of the present invention.

Referring to FIG. 1, the integrated GPS/IMU microsystem of a carrier comprises:

an IMU 1, for producing orthogonal three-axis (X axis, Y axis and Z axis) angular rate signals and orthogonal three-axis (X-axis, Y axis and Z axis) acceleration signals to a mixed GPS/IMU/Magnetic Data Microprocessor 5 through an IMU processing interface 41;

an Earth's magnetic field detector 2, for producing the Earth's magnetic field vector measurement signals, including X, Y, Z axes signals of the Earth's magnetic field vector measurement in the body frame of the carrier, to the mixed GPS/IMU/Magnetic Data Microprocessor 5 through a magnetic processing interface 42;

a GPS chipset 3, for receiving GPS RF (Radio Frequency) signals and providing GPS measurements, including GPS position and velocity data or GPS raw pseudorange, range rate, and carrier phase measurements and ephemeris and navigation message from GPS satellites to the mixed GPS/IMU/Magnetic Data Microprocessor 5 through an GPS interface 43; wherein the mixed GPS/IMU/Magnetic Data Microprocessor 5, for computing a mixed GPS/IMU/magnetic position, velocity, attitude and heading solution, by means of combining the three-axis angular rate and three-axis acceleration, the GPS measurements, and the Earth magnetic field vector measurement, in order to provide a rich and accurate motion measurement of the carrier to meet diverse needs;

a user Interface 6, for exchanging the mixed GPS/IMU/magnetic position, velocity, attitude and heading data with an external user; and a power supply and clock module 9, for providing all voltage and timing signals for other devices of the system of the present invention.

The Earth's magnetic field detector 2, is used for producing the Earth's magnetic field vector measurements to provide additional redundant heading information for the system of the present invention.

Generally, the output of the Earth's magnetic field detector 2 is an analog voltage signal. The Earth's magnetic field detector interface 42, is used to condition the output signal of the Earth's magnetic field detector 2, and digitize the output signal of the Earth's magnetic field detector 2, and output the digital Earth's magnetic field vector to the mixed GPS/IMU/Magnetic Data Microprocessor 5.

Figure 2:
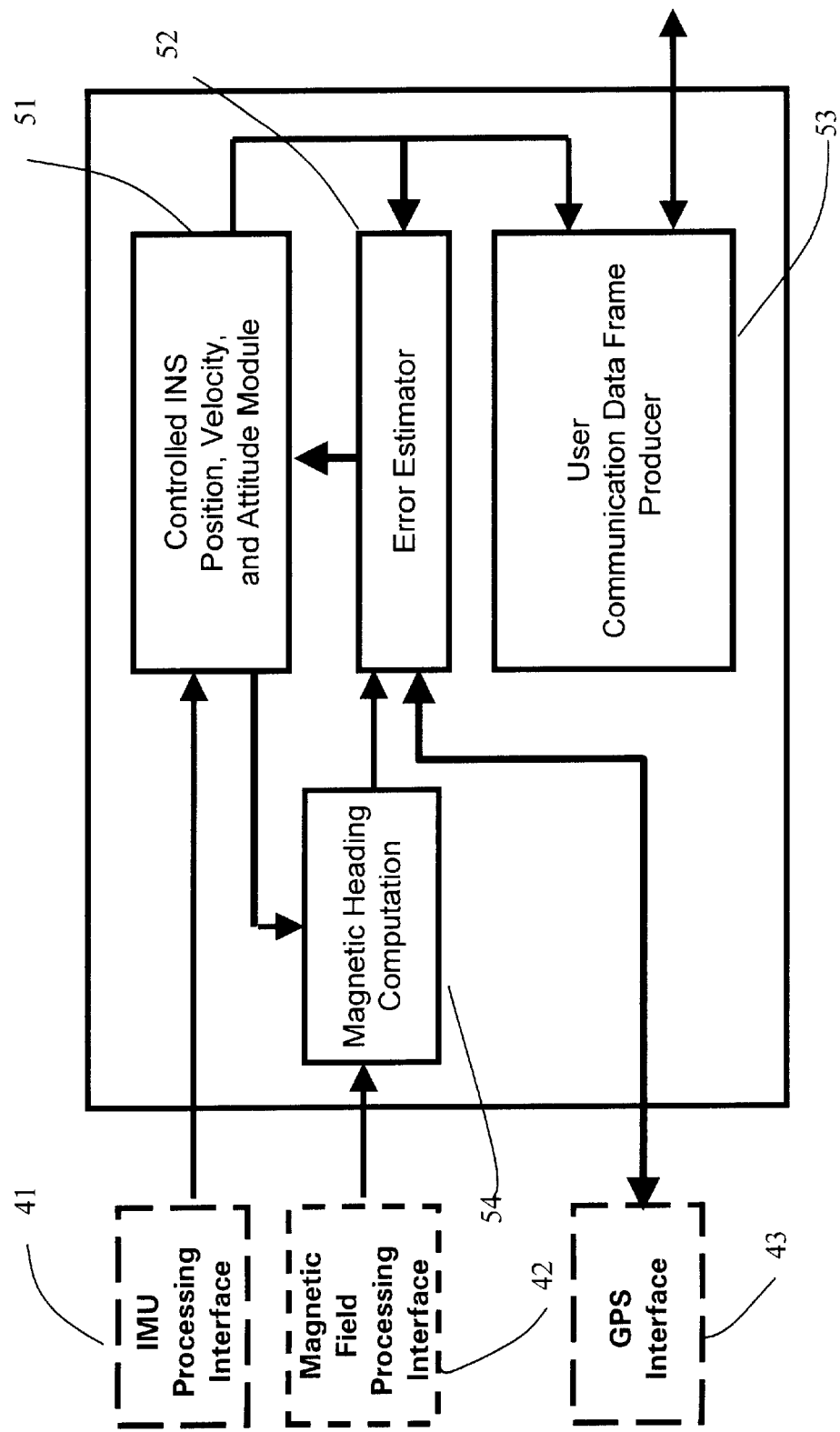
FIG. 2 is a functional block diagram illustrating processing modules running in the mixed GPS/IMU/Magnetic Data microprocessor of the integrated GPS/IMU microsystem of the present invention.

Referring to FIG. 2, the mixed GPS/IMU/Magnetic Data Microprocessor 5 comprises:

(1) a controlled position, velocity and attitude module 51, for processing the digital angular rate and acceleration from the IMU processing interface 41 to compute inertial position, velocity, and attitude data; and performing error correction to control and remove the drift of the inertial position, velocity, and attitude data, using optimal estimates of inertial position, velocity, and attitude errors from an error estimator module 52 to obtain highly accurate mixed GPS/IMU/magnetic position, velocity, and attitude data;

(2) an error estimator module 52, for processing the position, velocity, and attitude solution from the position, velocity and attitude module 51, the GPS measurements from the GPS chipset 3, magnetic heading data from a magnetic heading computation 53 to produce optimal estimates of inertial position, velocity, and attitude errors, which are fed back to the position, velocity and attitude module 51;

(3) a magnetic heading computation 54, receiving the three-axis digital Earth's magnetic field vector data from the magnetic field processing interface 42 and the pitch and roll angle data from the controlled position, velocity, and attitude module 51 and computing magnetic heading data to the error estimator module 52, and (4) a user communication data frame producer 53, for managing input and output data for the external user.

The magnetic field processing interface 42, connected between the Earth's magnetic field detector 2 and the mixed GPS/IMU/Magnetic Data Microprocessor 5, performs:

(1) Receiving the electronic analog magnetic field signals, which are proportional to the Earth's magnetic field, from the Earth's magnetic field detector 2;

(2) Amplifying the analog magnetic field signals to suppress noise in the electronic analog signal, which is not proportional to the Earth's magnetic field;

(3) Converting the amplified signals to form three-axis digital Earth's magnetic field data, which are input to the mixed GPS/IMU/Magnetic Data Microprocessor 5;

(4) Providing data/address/control bus connection and producing an address decode function, so that the mixed GPS/IMU/Magnetic Data Microprocessor 5 can access the magnetic field processing interface 42 and pickup the three-axis digital Earth's magnetic field data.

Figure 3:
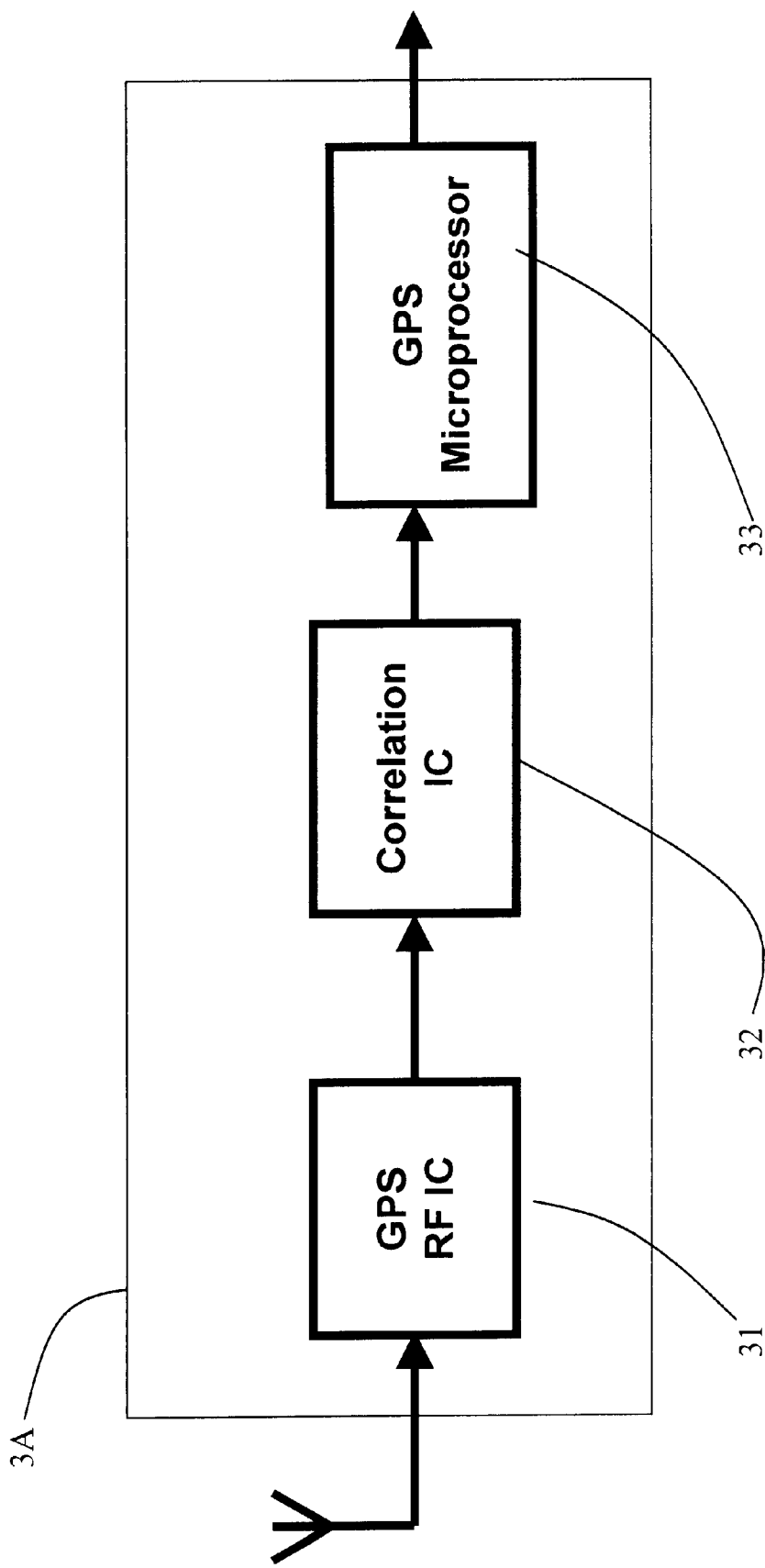
FIG. 3 is a block diagram illustrating the first preferred embodiment of the GPS chipset.

Referred to FIG. 3, the first preferred embodiment of the GPS chipset board 3 comprises:

(1) a GPS RF (Radio Frequency) IC (Integrated Circuit) 31, for receiving the GPS RF signals from a GPS antenna and downconverting, and sampling the incoming RF GPS signal and providing Sign and Magnitude digital output to a Correlation IC 32;

(2) a correlation IC 32, for correlating the Sign and Magnitude digital stream with the appropriate local carrier and code to de-spread the GPS signals to output I and Q (in-phase and quadraphase) samples to a GPS microprocessor; and (3) a GPS microprocessor 33, for processing the I and Q samples to close the GPS signal tracking loops and to derive the GPS raw measurements and navigation solution.

Figure 4:
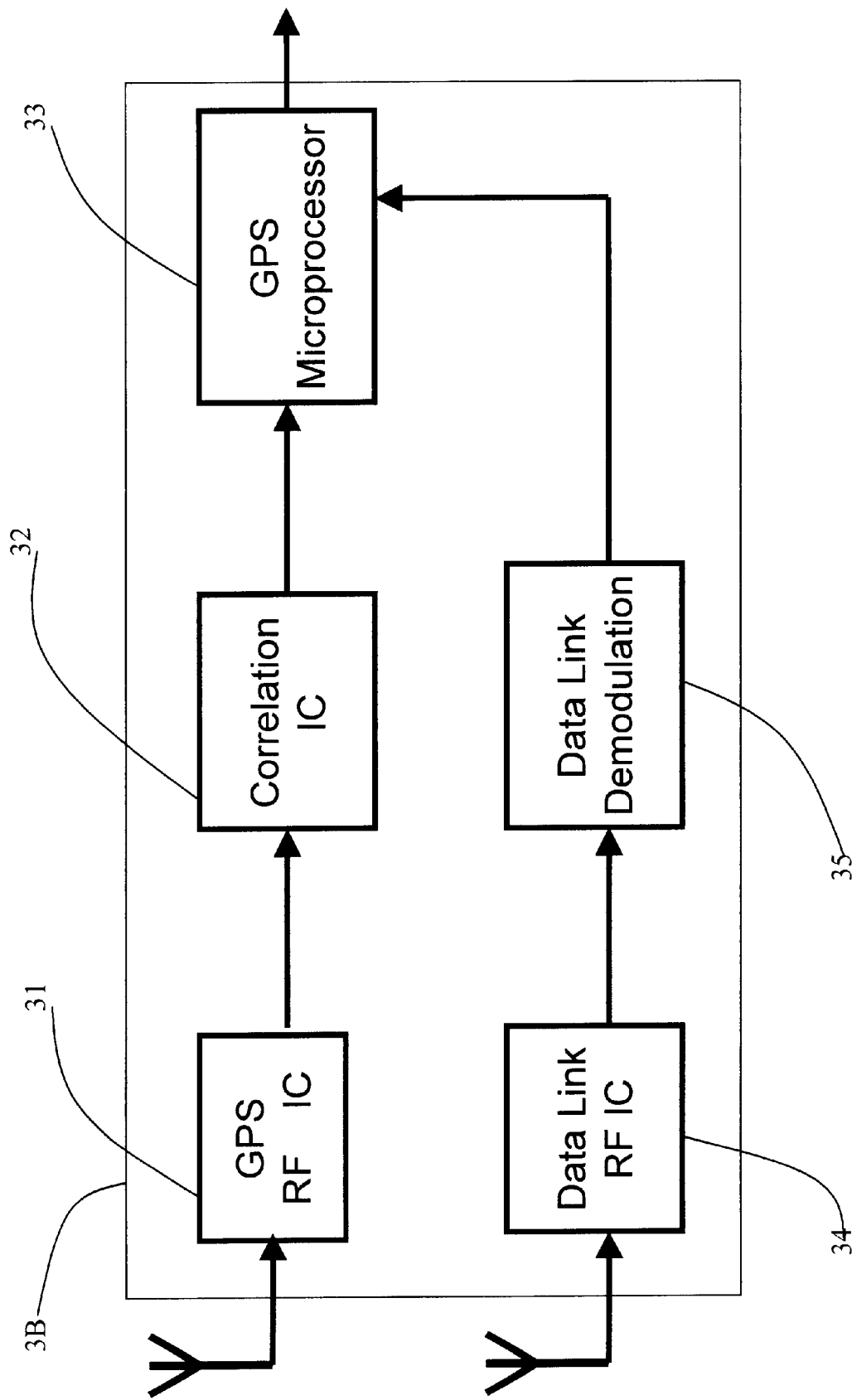
FIG. 4 is a block diagram illustrating the second preferred embodiment of the GPS chipset with differential GPS function.

Referred to FIG. 4, the second preferred embodiment of the GPS chipset board comprises:

(1) a GPS RF (Radio Frequency) IC (Integrated Circuit) 31, for receiving the GPS RF signals from an antenna and downconverting, and sampling the incoming RF GPS signal, and providing Sign and Magnitude digital output to a Correlation IC;

(2) a correlation IC 32, for correlating the Sign and Magnitude digital stream with the appropriate carrier and code to de-spread the GPS signals to output I and Q (in-phase and quadraphase) samples to a GPS microprocessor;

(3) a data link IC 34, for receiving the data link RF signal from a differential GPS site and downconverting it to Data link IF (Intermediate Frequency IF) signal to a Data link demodulation module 35;

(4) a data demodulation module 35, for demodulating the data link IF signal to output GPS differential correction data to a GPS microprocessor 33; and (5) a GPS microprocessor 33, for processing the I and Q samples and the GPS differential data to close the GPS signal tracking loops and to derive the GPS navigation solution.

Furthermore, the inertial velocity and acceleration from the mixed GPS/IMU/magnetic data microprocessor 5, which are corrected by the error estimator 52, can be fed back to the GPS microprocessor 33 to aid the code and carrier phase tracking of the GPS satellite signals so as to enhance the performance of the integrated GPS/IMU in heavy jamming and high dynamic environments.

Figure 5:
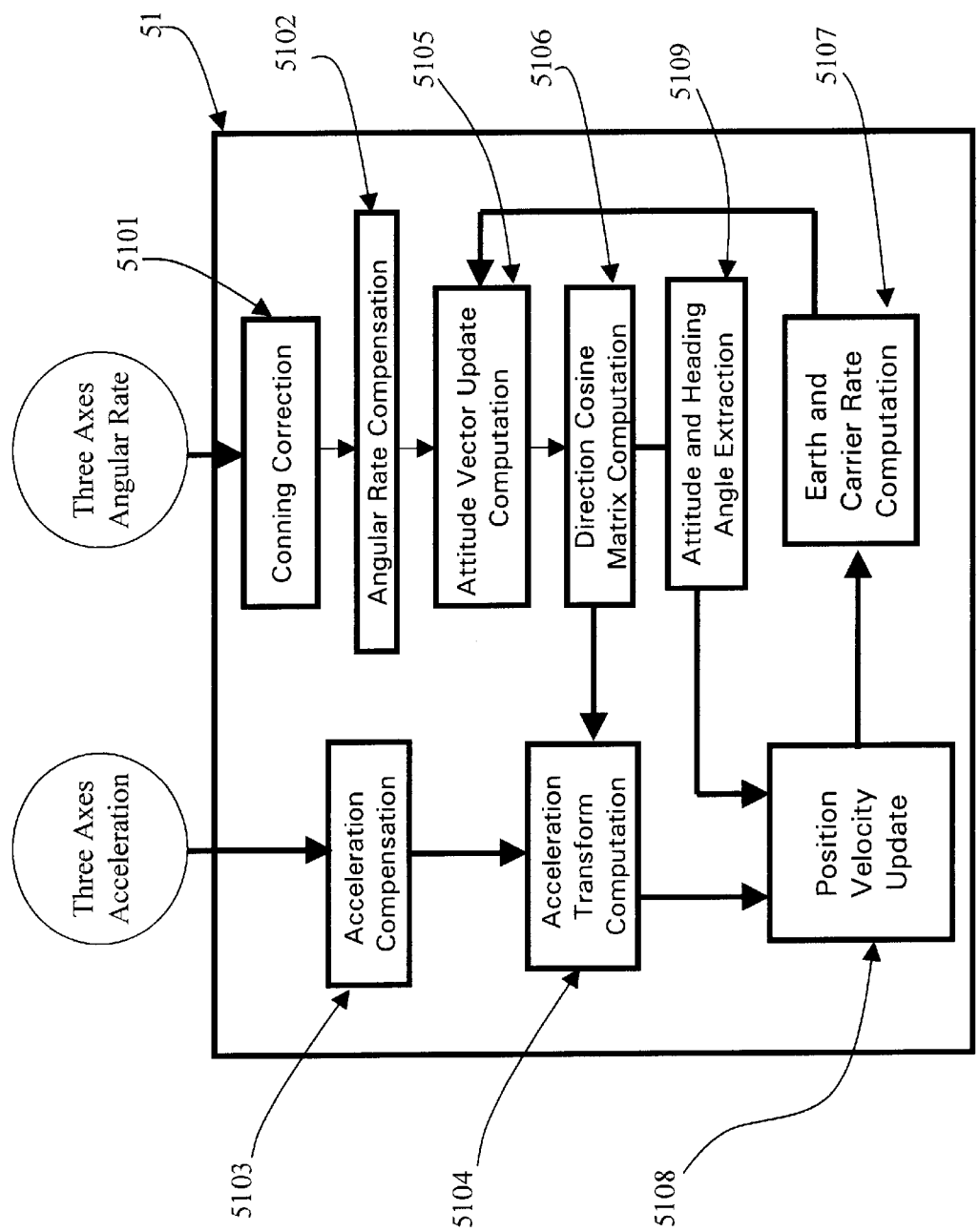
FIG. 5 is a functional block diagram illustrating the controlled position velocity and attitude module according to the above preferred embodiment of the present invention.

Referring to FIG. 5, the controlled Position, velocity, and attitude Module 51 comprises:

a coning correction module 5101, for receiving the three angular rate data to form three digital angular increments by integrating the three angular rate during a predetermined short interval; accepting the digital three-axis angular increment and coarse angular rate bias obtained from an IMU calibration procedure at a high data rate (short interval) and for computing coning effect errors using the input digital three-axis angular increment values and coarse angular rate bias and outputting three-axis coning effect data and three-axis angular increment data at a reduced data rate (long interval), which are called three-axis long-interval angular increment values and output into the angular rate compensation module 5102;

an angular rate compensation module 5102, for receiving the coning effect errors and three-axis long-interval angular increment values from the coning correction module 5101 and angular rate device misalignment parameters and fine angular rate bias from the angular rate producer and acceleration producer calibration procedure and for compensating definite errors in the three-axis long-interval angular increment values using the coning effect errors, angular rate device misalignment parameters, fine angular rate bias, and coning correction scale factor in the three-axis long-interval angular increments and outputting the real three-axis angular increments to an alignment rotation vector computation module 5105;

an alignment rotation vector computation module 5105 for receiving the compensated three-axis angular increments from the angular rate compensation module 5102 and the rotation rate vector of the local navigation frame (n frame) of the carrier relative to the inertial frame (i frame) from an earth and carrier rate computation module 5107 and updating a quaternion, which is a vector representing rotation angle of the carrier and outputting the updated quaternion is connected to a direction cosine matrix computation module 5106;

a direction cosine matrix computation module 5106, for computing the direction cosine matrix by using the updated quaternion and receiving the optimal estimates of the attitude errors from error estimator 52 to correct the direction cosine matrix;

an acceleration compensation module 5103, for receiving the three acceleration data to form three digital velocity increments by integrating the three accelerations during a predetermined interval; compensating the definite errors in three-axis velocity increments using the acceleration device misalignment, accelerometer bias, wherein the compensated three-axis velocity increments are connected to the level acceleration computation module 5104;

a level acceleration computation module 5104, for receiving the compensated three-axis velocity increments and computing level velocity increments using the compensated three-axis velocity increments from the acceleration conipensation module 5104 and the direction cosine matrix from the direction cosine matrix computation module 5106.

an attitude and heading angle extraction module 5109, for extracting GPS/IMU mixed attitude and heading angle using the corrected direction cosine matrix;

a position and velocity update module 5108 which accepts the level velocity increments from the level acceleration computation module 5204 and computes position and velocity solution and receiving the optimal estimates of the position and velocity errors from error estimator 52 to compensate the errors in the position and velocity solution to form mixed GPS/IMU/magnetic position and velocity data; and an earth and carrier rate computation module 5107 which accepts the position and velocity solution from the position and velocity update module 5208 and computes the rotation; rate vector of the local navigation frame (n frame) of the carrier relative to the inertial frame (i frame), which is connected to the alignment rotation vector computation module 5205.

The error estimator 52 establishes an INS error model and GPS error model as a state vector and processes the position, velocity and attitude solution from the controlled position, velocity and attitude module 51, GPS measurements from the GPS microprocessor 33, and magnetic heading data from the magnetic heading computation to provide the optimal estimate of the errors of the position, velocity, and attitude from the controlled position, velocity and attitude module 51 and GPS errors.

The error estimator is embodied as a Kalman filter. It is well known that the Kalman filter produces optimal estimates of a system state vector with well known statistical properties of the system and measurement. The estimates are unbiased and they have minimum variance within the class of linear unbiased estimates. The quality of the estimates is however only guaranteed as long as the assumptions underlying the mathematical model hold. Any misspecification in the system and measurement model may invalidate the results of filtering and thus also any conclusion based on them.

Therefore, the error estimator is further embodied as a robust Kalman filter. The robust Kalman filter is stable enough to operate in more than one dynamic environment. If the dynamics change drastically, or if a sensor failure occurs, for example, a GPS satellite signal failure or an inertial sensor signal failure, the robust Kalman filter must detect, rectify and isolate the failure situation.

A robust Kalman robust filter has the characteristic that it provides near-optimum performance over a large class of process and measurement models. The pure Kalman filter is not robust since it is optimal for only one particular system and measurement model. If the filter's model is not correct, the filter covariance may report accuracy which is different from what can actually be achieved. The purpose of filter integrity is to ensure that the predicted performance from the error covariance matrix is close to the actual estimation error statistics. In addition, filter divergence is usually caused by a changing system and measurement model, or a sensor failure.

Figure 6:
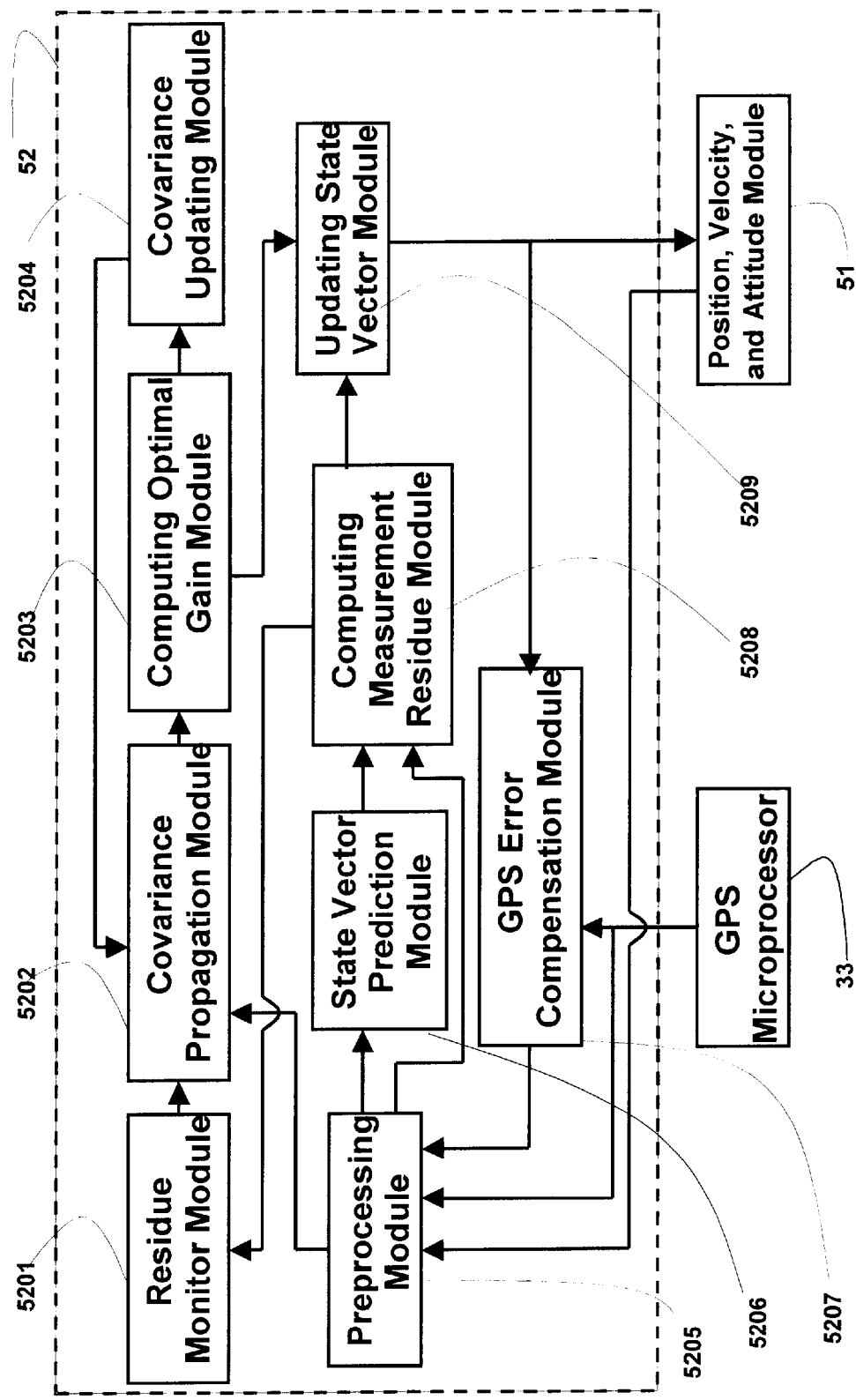
FIG. 6 is a functional block diagram illustrating the first preferred embodiment of the error estimator according to the above preferred embodiment of the present invention.

This present invention uses a residual monitoring method to obtain a robust Kalman filter which is used to blend the GPS data and the inertial sensor measurements. When the proper redundancy is available residual monitoring schemes can efficiently detect hard and soft failures and filter divergence. One benefit of the residual monitoring approach is that when the filter model is correct, the statistical distribution of the residual sequence is known. Thus, it is easy to generate a measurement editing and divergence detection scheme using a test-of-distribution on the measurement residuals. The same statistics can be used to assess the filter tuning and adjust the size of the covariance when divergence is detected. FIG. 6 gives the implementation of this robust Kalman filter including a residual monitoring function.

As shown in FIG. 6, a GPS error compensation module 5207 gathers the GPS measurements from the GPS microprocessor 33, and performs GPS measurement compensation using the optimal estimates of GPS error variables from an updating state vector module 5209 to perform GPS error compensation. The corrected GPS measurements are sent to the preprocessing module 5205.

A preprocessing module 5205 receives the GPS satellite ephemeris from the GPS microprocessor 33, the corrected GPS measurements from the GPS error compensation module 5207, and INS solutions from the controlled position, velocity and attitude module 51. The preprocessing module 5205 performs the calculation of the state transition matrix and sends it as well as the previous state vector to a state vector prediction module 5206. The calculated state transit matrix is also sent to a covariance propagation module 5802. The preprocessing module 5205 calculates the measurement matrix and the current measurement vector according to the computed measurement matrix and the measurement model. The measurement matrix and the computed current measurement vector are passed to a computing measurement residue module 5208.

The state vector prediction module 5206 receives the state transition matrix and the previous state vector from the preprocessing module 5205 to perform state prediction of the current epoch. The predicted current state vector is passed to the computing measurement residue module 5208.

The computing measurement residue module 5208 receives the predicted current state vector from the state vector prediction module 5206 and the measurement matrix and the current measurement vector from the preprocessing module 5205. The computing measurement residue module 5208 calculates the measurement residues by subtracting the multiplication of the measurement matrix and the predicted current state vector from the current measurement vector. The measurement residues are sent to a residue monitor module 5201 as well as the updating state vector module 5209.

The residue monitor module 5201 performs a discrimination on the measurement residues received from the computing measurement residue module 5208. The discrimination law is whether the square of the measurement residues divided by the residual variance is larger than a given threshold. If the square of the measurement residues divided by the residual variance is larger than this given threshold, the current measurement may lead to the divergence of the Kalman filter. When it occurs, the residue monitor module 5201 calculates a new covariance of the system process or rejects the current measurement. If the square of the measurement residues divided by the residual variance is less than this given threshold, the current measurement can be used by the Kalman filter without changing the current covariance of the system process to obtain the current navigation solution. The covariance of the system process is sent to the covariance propagation module 5202.

The covariance propagation module 5202 gathers the covariance of the system process from the residue monitor module 5201, the state transition matrix from the preprocessing module 5205, and the previous covariance of estimated error to calculate the current covariance of the estimated error. The computed current covariance of the estimated error is sent to a computing optimal gain module 5203.

The computing optimal gain module 5203 receives the current covariance of the estimated error from the covariance propagation module 5202 to compute the optimal gain. This optimal gain is passed to a covariance updating module 5204 as well as the updating state vector module 5209. The covariance updating module 5204 updates the covariance of the estimated error and sends it to the covariance propagation module 5202.

The updating state vector module 5209 receives the optimal gain from the computing optimal gain module 5203 and the measurement residues from the computing measurement residue module 5208. The updating state vector module 5209 calculates the current estimate of state vector including position, velocity and attitude errors and GPS errors, and sends them to the GPS error compensation module 5207 and the controlled position velocity and attitude module 51.

The magnetic heading computation module 53 receives the three-axis digital Earth's magnetic field signals from the magnetic field processing interface 42 and the pitch and roll angle data from the controlled INS position, velocity, and attitude module 51 and computes magnetic heading data. The magnetic heading computation module 53 further performs:

(1) loading the calibration parameters of the Earth's magnetic field detector 2 from the non-volatile memory of the mixed GPS/IMU/magnetic data microprocessor 5 to form a magnetic calibration vector;

(2) receiving the three-axis digital Earth's magnetic field signals from the magnetic field processing interface 42, which is expressed in the body frame, to form a magnetic measurement vector;

(3) receiving the pitch and roll angle data from the controlled INS position, velocity, and attitude module 51 to form a transformation matrix from the body frame to level frame;

(4) compensating the magnetic measurement vector with the magnetic calibration vector;

(5) transforming the compensated magnetic measurement vector from the body frame to the level frame to form a transformed magnetic measurement vector, which is expressed in the level frame; and (6) computing magnetic heading data using the transformed magnetic measurement vector expressed in the level frame, which is output to error estimator 52.

The system state vector of the error estimator 52 which is preferably a Kalman filter comprises INTS navigation parameter errors, inertial sensor errors, and GPS errors.

Currently, MEMS inertial sensors are very sensitive to change of environment temperature because they are inherently mechanical inertial sensors in micro size. Therefore, the MEMS inertial sensor error models used in the system state equation vary dependant on the environment temperature. If the assumed MEMS inertial sensor error models are mismatched with the real ones, this may cause the Kalman filter divergence. Existing approaches to handle the situation is to employ a kind of temperature control device to keep a predetermined operational temperature of the MEMS inertial sensors. An accurate temperature control device for the inertial sensor to adapt to a wide range of environment temperature involves a high performance feedback control loop, which generally consists of a temperature sensor, a temperature controller, and a heater and cooler (generally a fan). Although the existing approach is also feasible for the system of the present system, the existing approach results in increase of size, weight, and power consumption, also creates noise due to the fan. These defects with the existing approaches may be not acceptable for some commercial applications, such as personal handheld devices that are often powered by a battery. In order to deal with this tough situation, a software approach is disclosed in the present invention, wherein the second preferred embodiment of the error estimator 52A are formed to minimize the effect of environment temperature change on the accuracy and stability of the mixed GPS/IMU/magnetic position, velocity, and attitude solution.

Figure 8:
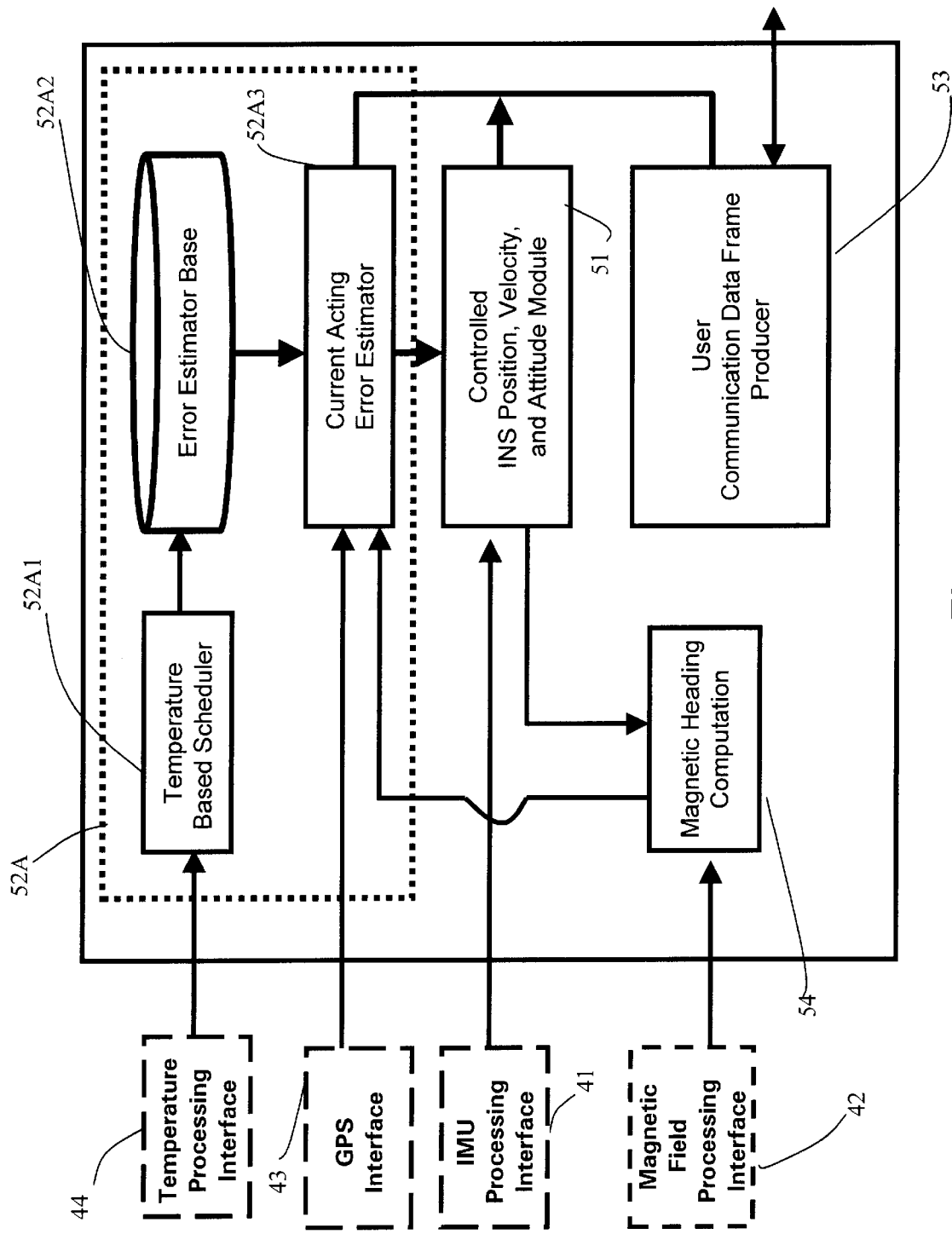
FIG. 8 is a functional block diagram illustrating the second preferred embodiment of the error estimator of the present invention.

Referring to FIG. 8, the second preferred embodiment of the error estimator 52A further comprises a temperature based scheduler 52A1, error estimator base 52A2, and a current acting error estimator 52A3 to deal with the model mismatching due to the change of the environment temperature.

Figure 7:
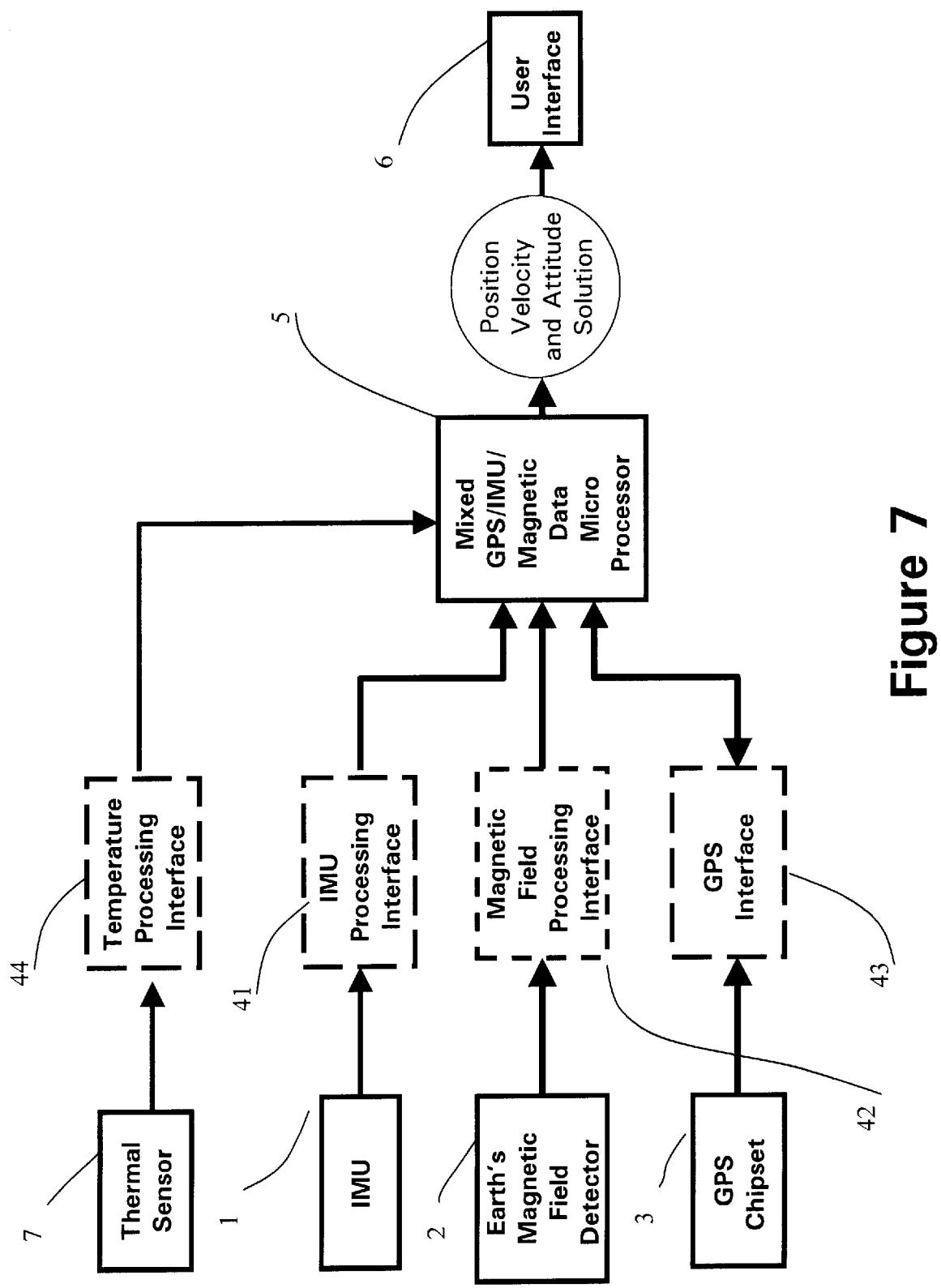
FIG. 7 is a block diagram illustrating the another preferred embodiment of the integrated GPS/IMU microsystem of the present invention for a wide range of operational environment.

Referring to FIG. 7. a thermal sensor 7 is installed inside or outside the MEMS IMU 1 to measure the operational temperature of the MEMS IMU 1. The temperature processing interface 44 is used to condition the output of the a thermal sensor 7 to provide digital temperature data to the temperature based scheduler 52A1 of the mixed GPS/IMU/Magnetic data microprocessor 5.

Figure 9:
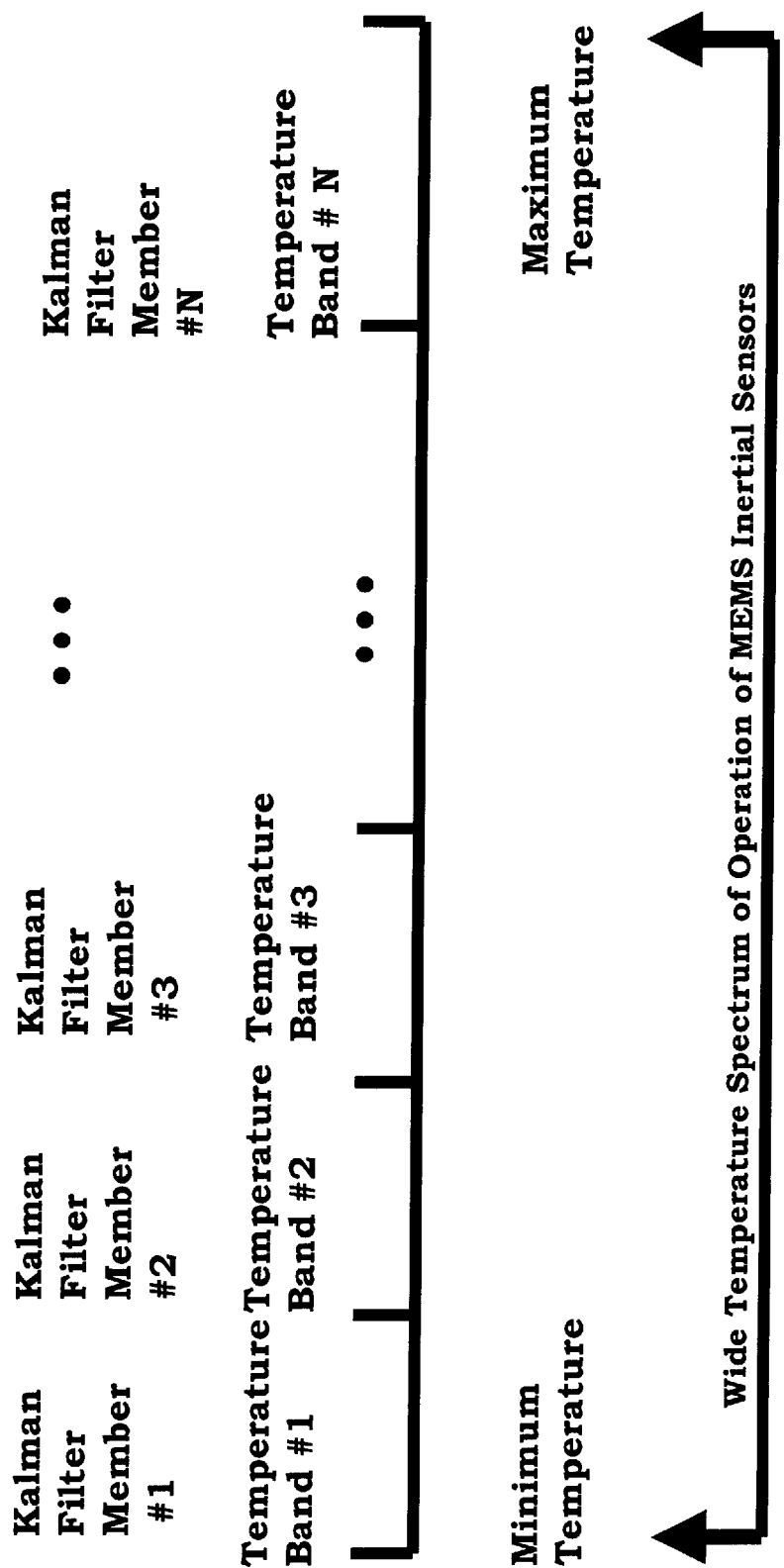
FIG. 9 shows the configuration of the error estimator base according to the above second preferred embodiment of the error estimator.

Referring to FIG. 9, a wide temperature spectrum of operation of MEMS inertial sensors can be divided into sections of the temperature band. In each temperature band, an optimal system model of the Kalman filter can be created through a series of MEMS IMU lab test and off-line covariance analysis and tuning of the Kalman filter. All optimal Kalman filters of the temperature bands are constructed into a error estimator base 52A2. Each optimal Kalman filter for the particular temperature band is a member of the error estimator base 52A2. Referring to FIG. 8, the second preferred embodiment of the error estimator 52A comprises:

a temperature based scheduler 52A1, for receiving the current operation temperature of the MEMS IMU 1 from the thermal sensor 7 through the temperature processing interface 44 and forming a query parameter of an optimal Kalman filter to an error estimator base 52A2, based on a predetermined logic relationship between an operational temperature of the IMU 1 and a Kalman filter member; and an error estimator base 52A2, for receiving the query parameter of an optimal Kalman filter and finding the parameters of the optimal Kalman filter and constructing the optimal Kalman filter as a current acting error Kalman filter 52A3;

wherein the current acting Kalman error estimator 52A3, receiving the current INS position, velocity and attitude data from the controlled INS position, velocity, and attitude module 51, GPS measurements from the GPS microprocessor 33, and magnetic heading from the magnetic heading computation module 54 to producing optimal estimates of errors of the current INS position, velocity and attitude data, which is sent to the controlled INS position, velocity, and attitude module 51 to achieve the mixed GPS/IMU/magnetic position, velocity and attitude data.

Referring to FIG. 1, an integrated GPS/IMU method comprises the following steps:

(1) producing orthogonal three-axis (X axis, Y axis and Z axis) angular rate signals and orthogonal three-axis (X-axis, Y axis and Z axis) acceleration signals to a mixed GPS/IMU/Magnetic Data Microprocessor 5 through an IMU processing interface 41 by an IMU 1;

(2) producing the Earth's magnetic field vector measurement signals, including X, Y, Z axes signals of the Earth's magnetic field vector measurement in the body frame of the carrier, to the mixed GPS/IMU/Magnetic Data Microprocessor 5 through a magnetic processing interface 42, by an Earth's magnetic field detector 2;

(3) receiving GPS RF (Radio Frequency) signals and providing GPS measurements, including GPS position and velocity data or GPS raw pseudorange, range rate, and carrier phase measurements and ephemeris and navigation message from GPS satellites to the mixed GPS/IMU/Magnetic Data Microprocessor 5 through an GPS interface 43 by a GPS chipset 3;

(4) computing a mixed GPS/IMU/magnetic position, velocity, attitude and heading solution, by means of combining the three-axis angular rate and three-axis acceleration, the GPS measurements, and the Earth magnetic field vector measurement, in order to provide a rich and accurate motion measurement of the carrier to meet diverse needs, by the mixed GPS/IMU/Magnetic Data Microprocessor 5;

(5) exchanging the mixed GPS/IMU/magnetic position, velocity, attitude and heading data with an external user, by an user Interface 6; and (6) providing all voltage and timing signals for other devices of the system of the present invention, by a power supply and clock module 9.

Referring to FIG. 2, the step (4) further comprises:

4.1 processing the digital angular rate and acceleration from the IMU processing interface 41 to compute inertial position, velocity, and attitude data by a controlled position, velocity and attitude module, for; and performing error correction to control and remove the drift of the inertial position, velocity, and attitude data, using optimal estimates of inertial position, velocity, and attitude errors from an error estimator module 52 to obtain highly accurate mixed GPS/IMU/magnetic position, velocity, and attitude data;

4.2 processing the position, velocity, and attitude solution from the position, velocity and attitude module 51, the GPS measurements from the GPS chipset 3, magnetic heading data from a magnetic heading computation 53 to produce optimal estimates of inertial position, velocity, and attitude errors, which are fed back to the position, velocity and attitude module 51, by a error estimator module 52;

4.3 receiving the three-axis digital Earth's magnetic field vector data from the magnetic field processing interface 42 and the pitch and roll angle data from the controlled position, velocity, and attitude module 51 and computing magnetic heading data to error estimator module 52, by a magnetic heading computation 54; and 4.4 managing input and output data for the external user, by an user communication data frame producer 53;

Referring to FIG. 7 and 8, between the step (3) and (4), the integrated GPS/IMU method further comprises additional step (4A):

(4A.1) measuring the operational temperature of the IMU, by a thermal sensor 7 installed inside or outside the IMU 1; and (4A.2) conditioning the operational temperature of the thermal sensor 7 to provide digital operational temperature data by a temperature processing interface 44;

and, the step (4.2) further comprises:

(4.2.1) receiving the current operation temperature of the MEMS IMU 1 from the thermal sensor 7 through the temperature processing interface 44 and forming a query parameter of an optimal Kalman filter to an error estimator base 52A2, based on a predetermined logic relationship between temperature and Kalman filter member, by a temperature based scheduler 52A1;

(4.2.2) receiving the query parameter of an optimal Kalman filter and finding the parameters of the optimal Kalman filter and constructing the optimal Kalman filter and updating a current acting error Kalman filter, by an error estimator base 52A2; and (4.2.3) receiving the current INS position, velocity and attitude data from the controlled INS position, velocity, and attitude module 51, GPS measurements from the GPS microprocessor, and magnetic heading from the magnetic heading computation module 54 to producing optimal estimates of errors of the current INS position, velocity and attitude data, which is sent to the controlled INS position, velocity, and attitude module 51 to achieve the mixed GPS/IMU/magnetic position, velocity and attitude data, by the updated current acting Kalman error estimator 53A3.

The step (4.3) further comprises:

4.3.1 loading the calibration parameters of the Earth's magnetic field detector 2 from the non-volatile memory of the mixed GPS/IMU/magnetic data microprocessor 5 to form a magnetic calibration vector;

4.3.2 receiving the three-axis digital Earth's magnetic field signals from the magnetic field processing interface 42, which is expressed in the body frame, to form a magnetic measurement vector;

4.3.3 receiving the pitch and roll angle data from the controlled INS position, velocity, and attitude module 51 to form a transformation matrix from the body frame to level frame;

4.3.4 compensating the magnetic measurement vector with the magnetic calibration vector;

4.3.5 transforming the compensated magnetic measurement vector from the body frame to the level frame to form a transformed magnetic measurement vector, which is expressed in the level frame; and 4.3.6 computing magnetic heading data using the transformed magnetic measurement vector expressed in the level frame, which is output to error estimator 52.

What is claimed is:

1. An integrated Global Positioning System (GPS)/Inertial Measurement Unit (IMU) microsystem for a carrier, comprising:

an IMU, for producing orthogonal three-axis (X axis, Y axis and Z axis) angular rate signals and orthogonal three-axis (X-axis, Y axis and Z axis) acceleration signals to a mixed GPS/IMU/Magnetic Data Microprocessor through an IMU processing interface;

an Earth's magnetic field detector, for producing said Earth's magnetic field vector measurement signals, including X, Y, Z axes signals of said Earth's magnetic field vector measurement in said body frame of said carrier, to said mixed GPS/IMU/Magnetic Data Microprocessor through a magnetic processing interface;

a GPS chipset, for receiving GPS RF (Radio Frequency) signals and providing GPS measurements, including GPS position and velocity data or GPS raw pseudorange, range rate, and carrier phase measurements and ephemeris and navigation message from is GPS satellites to said mixed GPS/IMU/Magnetic Data Microprocessor through an GPS interface; wherein said mixed GPS/IMU/Magnetic Data Microprocessor, for computing a mixed GPS/IMU/magnetic position, velocity, attitude and heading solution, by means of combining said three-axis angular rate and three-axis acceleration, said GPS measurements, and said Earth magnetic field vector measurement, in order to provide a rich and accurate motion measurement of said carrier to meet diverse needs;

an user Interface, for exchanging said mixed GPS/IMU/magnetic position, velocity, attitude and heading data with an external user; and a power supply and clock module, for providing all voltage and timing signals for other devices of said system of said present invention.

2. The integrated Global Positioning System (GPS)/Inertial Measurement Unit (IMU) microsystem, as recited in claim 1, wherein said output of said Earth's magnetic field detector is analog voltage signal, Said Earth's magnetic field detector interface, is used to condition said output signal of said Earth's magnetic field detector, and digitize said output signal of said Earth's magnetic field detector, and output said digital Earth's magnetic field vector to said mixed GPS/IMU/Magnetic Data Microprocessor.

3. The integrated Global Positioning System (GPS)/Inertial Measurement Unit (IMU) microsystem, as recited in claim 2, wherein said mixed GPS/IMU/Magnetic Data Microprocessor comprises:

a controlled position, velocity and attitude module, for processing said digital angular rate and acceleration from said IMU processing interface to compute inertial position, velocity, and attitude data; and performing error correction to control and remove said drift of said inertial position, velocity, and attitude data, using optimal estimates of inertial position, velocity, and attitude errors from an error estimator module to obtain highly accurate mixed GPS/IMU/magnetic position, velocity, and attitude data;

an error estimator module, for processing said position, velocity, and attitude solution from said position, velocity and attitude module, said GPS measurements from said GPS chipset magnetic heading data from a magnetic heading computation to produce optimal estimates of inertial position, velocity, and attitude errors, which are fed back to said position, velocity and attitude module;

a magnetic heading computation, receiving said three-axis digital Earth's magnetic field vector data from said magnetic field processing interface and said pitch and roll angle data from said controlled position, velocity, and attitude module and computing magnetic heading data to error estimator module, and a user communication data frame producer, for managing input and output data for said external user.

4. The integrated Global Positioning System (GPS)/Inertial Measurement Unit (IMU) microsystem, as recited in claim 3, wherein said magnetic field processing interface, connected between said Earth's magnetic field detector and said mixed GPS/IMU/Magnetic Data Microprocessor:

receiving said electronic analog magnetic field signals, which are proportional to said Earth's magnetic field, from said Earth's magnetic field detector;

amplifying said analog magnetic field signals to suppress noise in said electronic analog signal, which is not proportional to said Earth's magnetic field;

converting said amplified signals to form three-axis digital Earth's magnetic field data, which are input to said mixed GPS/IMU/Magnetic Data Micro processor; and providing data/address/control bus connection and producing an address decode function, so that said mixed GPS/IMU/Magnetic Data Microprocessor accesses said magnetic field processing interface and pickups said three-axis digital Earth's magnetic field data.

5. The integrated Global Positioning System (GPS)/Inertial Measurement Unit (IMU) microsystem, as recited in claim 4, wherein said GPS chipset board comprises:

a GPS RF (Radio Frequency) IC (Integrated Circuit), for receiving said GPS RF signals from a GPS antenna and downconverting, and sampling said incoming RF GPS signal, and providing Sign and Magnitude digital output to a Correlation IC;

a correlation IC, for correlating said Sign and Magnitude digital stream with said appropriate local carrier an d code to de-spread said GPS signals to output I and Q (in-phase and quadraphase) samples to a GPS microprocessor; and a GPS microprocessor, for processing said I and Q samples to close said GPS signal tracking loops and to derive said GPS raw measurements and navigation solution.

6. The integrated Global Positioning System (GPS)/Inertial Measurement Unit (IMU) microsystem, as recited in claim 4, wherein said GPS chipset board comprises:

a GPS RF (Radio Frequency) IC (Integrated Circuit), for receiving said GPS RF signals from a antenna and downconverting, and sampling said incoming RF GPS signal, and providing Sign and Magnitude digital output to a Correlation IC;

a correlation IC, for correlating said Sign and Magnitude digital stream with said appropriate carrier and code to de-spread said GPS signals to output I and Q (in-phase and quadraphase) samples to a GPS microprocessor;

a data link IC, for receiving said data link RF signal from a differential GPS site and downconverting it to Data link IF (Intermediate Frequency IF) signal to a Data link demodulation module;

a data demodulation module, for demodulating said data link IF signal to output GPS differential correction data to a GPS microprocessor; and a GPS microprocessor, for processing said I and Q samples and said GPS differential data to close said GPS signal tracking loops and to derive said GPS navigation solution.

7. The integrated Global Positioning System (GPS)/Inertial Measurement Unit (IMU) microsystem, as recited in claim 4, wherein said controlled Position, velocity, and attitude Module comprises:

a coning correction module, for receiving said three angular rate data to form three digital angular increments by integrating said three angular rate during a predetermined short interval; accepting said digital three-axis angular increment and coarse angular rate bias obtained from an IMU calibration procedure at a high data rate (short interval) and for computing coning effect errors using said input digital three-axis angular increment values and coarse angular rate bias, and outputting three-axis coning effect data and three-axis angular increment data at a reduced data rate (long interval), which are called three-axis long-interval angular increment values and output into said angular rate compensation module;

an angular rate compensation module, for receiving said coning effect errors and three-axis long-interval angular increment values from said coning correction module and angular rate device misalignment parameters and fine angular rate bias from said angular rate producer and acceleration producer calibration procedure and for compensating definite errors in said three-axis long-interval angular increment values using said coning effect errors, angular rate device misalignment parameters, fine angular rate bias, and coning correction scale factor in said three-axis long-interval angular increments and outputting said real three-axis angular increments to an alignment rotation vector computation module;

an alignment rotation vector computation module, for receiving said compensated three-axis angular increments from said angular rate compensation module and said rotation rate vector of said local navigation frame (n frame) of said carrier relative to said inertial frame (i frame) from an earth and carrier rate computation module and updating a quaternion, which is a vector representing rotation angle of said carrier and outputting said updated quaternion is connected to a direction cosine matrix computation module;

a direction cosine matrix computation module, for computing said direction cosine matrix by using said updated quaternion and receiving said optimal estimates of said attitude errors from error estimator to correct said direction cosine matrix;

an acceleration compensation module, for receiving said three acceleration data to form three digital velocity increments by integrating said three acceleration during a predetermined interval; compensating said definite errors in three-axis velocity increments using said acceleration device misalignment, accelerometer bias, wherein said compensated three-axis velocity increments are connected to said level acceleration computation module;

a level acceleration computation module, for receiving said compensated three-axis velocity increments and computing level velocity increments using said compensated three-axis velocity increments from said acceleration compensation module and said direction cosine matrix from said direction cosine matrix computation module;

an attitude and heading angle extract module, for extracting. GPS/IMU mixed attitude and heading angle using said corrected direction cosine matrix;

a position and velocity update module which accepts said level velocity increments from said level acceleration computation module and computes position and velocity solution and receiving said optimal estimates of said position and velocity errors from error estimator to compensate said errors in said position and velocity solution to form mixed GPS/IMU/magnetic position and velocity data; and an earth and carrier rate computation module which accepts said position and velocity solution from said position and velocity update module and computes said rotation rate vector of said local navigation frame (n frame) of said carrier relative to said inertial frame (i frame), which is connected to said alignment rotation vector computation module.

8. The integrated Global Positioning System (GPS)/Inertial Measurement Unit (IMU) microsystem, as recited in claim 7, wherein said error estimator, which is further embodied as a robust Kalman filter, comprises:

a GPS error compensation module which gathers said GPS measurements from said GPS microprocessor, and perform GPS measurement compensation using said optimal estimates of GPS error variables from an updating state vector module to perform GPS error compensation, wherein said corrected GPS measurements are sent to said preprocessing module; and a preprocessing module which receives said GPS satellite ephemeris from said GPS microprocessor, said corrected GPS measurements from said GPS error compensation module, and INS solutions from said controlled position, velocity and attitude module, wherein said preprocessing module performs said calculation of said state transition matrix and sends with said previous state vector to a state vector prediction module, wherein said calculated state transit matrix is also sent to a covariance propagation module and said preprocessing module calculates said measurement matrix and said current measurement vector according to said computed measurement matrix and said measurement model, wherein said measurement matrix and said computed current measurement vector are passed to a computing measurement residue module;

wherein said state vector prediction module receives said state transition matrix and said previous state vector from said preprocessing module to perform state prediction of said current epoch, wherein said predicted current state vector is passed to said computing measurement residue module;

wherein said computing measurement residue module receives said predicted current state vector from said state vector prediction module and said measurement matrix and said current measurement vector from said preprocessing module, wherein said computing measurement residue module calculates said measurement residues by subtracting said multiplication of said measurement matrix and said predicted current state vector from said current measurement vector, wherein said measurement residues are sent to a residue monitor module as well as said updating state vector module, wherein said residue monitor module performs a discrimination on said measurement residues received from said computing measurement residue module, wherein said discrimination law is whether said square of said measurement residues divided by said residual variance is larger than a given threshold, wherein when said square of said measurement residues divided by said residual variance is larger than said given threshold said current measurement leads to said divergence of said Kalman filter, and then said residue monitor module selectively calculates a new covariance of said system process or rejects said current measurement, wherein when said square of said measurement residues divided by said residual variance is less than this given threshold said current measurement is used by said Kalman filter without changing said current covariance of system process to obtain said current navigation solution, wherein said covariance of said system process is sent to said covariance propagation module;

wherein said covariance propagation module gathers said covariance of said system process from said residue monitor module, said state transition matrix from said preprocessing module, and said previous covariance of estimated error to calculate said current covariance of said estimated error. Said computed current covariance of said estimated error is sent to a computing optimal gain module;

wherein said computing optimal gain module receives said current covariance of said estimated error from said covariance propagation module to compute said optimal gain, wherein said optimal gain is passed to a covariance updating module as well as said updating state vector module, and said covariance updating module updates said covariance of said estimated error and sends it to said covariance propagation module;

wherein said updating state vector module receives said optimal gain from said computing optimal gain module and said measurement residues from said computing measurement residue module, wherein said updating state vector module calculates said current estimate of state vector including position, velocity and attitude errors and GPS errors, and sends them to said GPS error compensation module and said controlled position velocity and attitude module.

9. The integrated Global Positioning System (GPS)/Inertial Measurement Unit (IMU) microsystem, as recited in claim 7, wherein said magnetic heading computation module:

(a) loads said calibration parameters of said Earth's magnetic field detector from said non-volatile memory of said mixed GPS/IMU/magnetic data microprocessor to form a magnetic calibration vector;

(b) receives said three-axis digital Earth's magnetic field signals from said magnetic field processing interface, which is expressed in said body frame, to form a magnetic measurement vector;

(c) receives said pitch and roll angle data from said controlled INS position, velocity, and attitude module to form a transformation matrix from said body frame to level frame;

(d) compensates said magnetic measurement vector with said magnetic calibration vector;

(e) transforms said compensated magnetic measurement vector from said body frame to said level frame to form a transformed magnetic measurement vector, which is expressed in said level frame; and (f) computes magnetic heading data using said transformed magnetic measurement vector expressed in said level frame, which is output to error estimator.

10. The integrated Global Positioning System (GPS)/Inertial Measurement Unit (IMU) microsystem, as recited in claim 3, wherein a thermal sensor is installed inside or outside said MEMS IMU to measure said operational temperature of said MEMS IMU, wherein said temperature processing interface is used to condition said output of said a thermal sensor to provide digital temperature data to said temperature based scheduler of said mixed GPS/IMU/Magnetic data microprocessor, wherein said error estimator comprises:

a temperature based scheduler, for receiving said current operation temperature of said MEMS IMU from said thermal sensor through said temperature processing interface and forming a query parameter of an optimal Kalman filter to an error estimator base, based on a predetermined logic relationship between temperature and Kalman filter member; and an error estimator base, for receiving said query parameter of an optimal Kalman filter and finding said parameters of said optimal Kalman filter and constructing said optimal Kalman filter and updating said current acting error Kalman filter;

wherein said current acting Kalman error estimator receives said current INS Poisson, velocity and attitude data from said controlled INS position, velocity, and attitude module, GPS measurements from said GPS microprocessor, and magnetic heading from said magnetic heading computation module to produce optimal estimates of errors of said current INS position, velocity and attitude data, which is sent to said controlled INS position, velocity, and attitude module to achieve said mixed GPS/IMU/magnetic position, velocity and attitude data.

11. An integrated GPS/IMU method, comprising the steps of:

(a) producing orthogonal three-axis (X axis, Y. axis and Z axis) angular rate signals and orthogonal three-axis (X-axis, Y axis and Z axis) acceleration signals to a mixed GPS/IMU/Magnetic Data Microprocessor through an IMU processing interface by an IMU;

(b) producing said Earth's magnetic field vector measurement signals, including X, Y, Z axes signals of said Earth's magnetic field vector measurement in said body frame of said carrier, to said mixed GPS/IMU/Magnetic Data Microprocessor through a magnetic processing interface, by an Earth's magnetic field detector;

(c) receiving GPS RF (Radio Frequency) signals and providing GPS measurements, including GPS position and velocity data or GPS raw pseudorange, range rate, and carrier phase measurements and ephemeris and navigation message from GPS satellites to said mixed GPS/IMU/Magnetic Data Microprocessor through an GPS interface by a GPS chipset;

(d) computing a mixed GPS/IMU/magnetic position, velocity, attitude and heading solution, by means of combining said three-axis angular rate and three-axis acceleration, said GPS measurements, and said Earth magnetic field vector measurement, in order to provide a rich and accurate motion measurement of said carrier to meet diverse needs, by said mixed GPS/IMU/Magnetic Data Microprocessor;

(e) exchanging said mixed GPS/IMU/magnetic position, velocity, attitude and heading data with an external user, by an user Interface; and (f) providing all voltage and timing signals for other devices of said system of said present invention, by a power supply and clock module.

12. The integrated GPS/IMU method, as recited in claim 11, wherein said step (d) further comprises:

d.1. processing said digital angular rate and acceleration from said IMU processing interface to compute inertial position, velocity, and attitude data by a controlled position, velocity and attitude module, for; and performing error correction to control and remove said drift of said inertial position, velocity, and attitude data, using optimal estimates of inertial position, velocity, and attitude errors from an error estimator module to obtain highly accurate mixed GPS/IMU/magnetic position, velocity, and attitude data;

d.2 processing said position, velocity, and attitude solution from said position, velocity and attitude module, said GPS measurements from said GPS chipset, magnetic heading data from a magnetic heading computation to produce optimal estimates of inertial position, velocity, and attitude errors, which are fed back to said position, velocity and attitude module, by a error estimator module;

d.3 receiving said three-axis digital Earth's magnetic field vector data from said magnetic field processing interface and said pitch and roll angle data from said controlled position, velocity, and attitude module and computing magnetic heading data to error estimator module, by a magnetic heading computation; and d.4 managing input and output data for said external user, by an user communication data frame producer.

13. The integrated GPS/IMU method as recited in claim 12, wherein between said step (c) and (d) further comprises additional step (dA):

(dA.1) measuring said operational temperature of said IMU, by a thermal sensor installed inside or outside said IMU; and (dA.2) conditioning said operational temperature of said a thermal sensor to provide digital temperature data operational temperature by a temperature processing interface;

and, step (d.2) further comprising:

(d.2.1) receiving said current operation temperature of said MEMS IMU from said thermal sensor through said temperature processing interface and forming a query parameter of an optimal Kalman filter to an error estimator base, based on a predetermined logic relationship between temperature and Kalman filter member, by a temperature based scheduler;

(d.2.2) receiving said query parameter of an optimal Kalman filter and finding said parameters of said optimal Kalman filter and constructing said optimal Kalman filter as a current acting error Kalman filter, by an error estimator base; and (d.2.3) receiving said current INS Poisson, velocity and attitude data from said controlled INS position, velocity, and attitude module, GPS measurements from said GPS microprocessor, and magnetic heading from said magnetic heading computation module to producing optimal estimates of errors of said current INS position, velocity and attitude data, which is sent to said controlled INS position, velocity, and attitude module to achieve said mixed GPS/IMU/magnetic position, velocity and attitude data, by said updated current acting Kalman error estimator.

14. The integrated GPS/IMU method, as recited in claim 13, wherein said step (d.3) further comprises:

(d.3.1) loading said calibration parameters of said Earth's magnetic field detector from said non-volatile memory of said mixed GPS/IMU/magnetic data microprocessor to form a magnetic calibration vector;

(d.3.2) receiving said three-axis digital Earth's magnetic field signals from said magnetic field processing interface, which is expressed in said body frame, to form a magnetic measurement vector;

(d.3.3) receiving said pitch and roll angle data from said controlled INS position, velocity, and attitude module to form a transformation matrix from said body frame to level frame;

(d.3.4) compensating said magnetic measurement vector with said magnetic calibration vector;

(d.3.5) transforming said compensated magnetic measurement vector from said body frame to said level frame to form a transformed magnetic measurement vector, which is expressed in said level frame; and (d.3.6) computing magnetic heading data using said transformed magnetic measurement vector expressed in said level frame, which is output to error estimator.

\* \* \* \* \*